Patented July 2, 1946

2,403,054

UNITED STATES PATENT OFFICE 2,403,054

SEPARATION OF CONJUGATED DIOLEFIN ISOMERS

David Craig, Silver Lake Village, Ohio, assignor, by mesne assignments, to The B. F. Goodrich Company, Akron, Ohio, a corporation of New York No Drawing. Application September 22, 1941, Serial No. 411,889

6 Claims. (Cl. 260—681.5)

This invention relates to the treatment of conjugated diolefin isomers and particularly to a method whereby piperylene may be separated into its geometric isomers.

I have discovered that piperylene as it is often obtained, by the high temperature pyrolysis of gas oil for instance, exists in the form of two geometric isomers having the following constants:

| B. P.$_{740}$ | $N_D^{20}$ | $D_{20}^{20}$ |
|---|---|---|
| 43.6° C.±0.2° | 1.4360 | 0.6921 |
| 41.5° C.±0.2° | 1.4300 | 0.6784 |

The high-boiling isomer is believed to be cis-piperylene, the low-boiling isomer trans-piperylene. Because of the proximity of their boiling points, it is difficult to separate the isomers by physical means.

I have discovered that high-boiling piperylene is considerably less reactive than low-boiling piperylene. The principal object of this invention, accordingly, is to separate piperylene isomers by making use of this difference in reactivity.

In its preferred form, the method of this invention consists in reacting a mixture of piperylene isomers with sulfur dioxide in such a manner that the low-boiling isomer reacts to form monomeric piperylene sulfone but the high-boiling isomer remains substantially unreacted. The mixture of high-boiling isomer and sulfur dioxide is then separated from the sulfone, the high-boiling piperylene and the sulfur dioxide are separated, and the sulfone is decomposed to form a mixture of low-boiling piperylene and sulfur dioxide from which the low-boiling piperylene is isolated.

The reaction of conjugated diolefins to form monomeric sulfones is well known, and is described by Staudinger et al., Ber. 68B, 455–71 (1935). The reaction of mixtures containing piperylene with sulfur dioxide to form the monomeric sulfone is described more specifically in my copending application Serial No. 389,469, filed April 19, 1941. While piperylene will react with sulfur dioxide at room temperature, it is desirable to employ elevated temperatures and pressures. There is some tendency for the polysulfone formation when low-boiling piperylene is reacted with sulfur dioxide so it is advisable to have present a small amount of polymerization inhibitor such as a diarylamine such as phenyl-beta-naphthyl-amine or a polyhydric phenol such as hydroquinone, catechol, pyrogallol, etc.

The mixture of piperylene isomers is allowed to react with the sulfur dioxide until the desired amount of low-boiling piperylene has reacted. High-boiling piperylene reacts slowly with the sulfur dioxide under the same conditions of temperature and pressure as low-boiling piperylene. At the start, the reaction of a mixture of the isomers is practically all between the sulfur dioxide and the low-boiling piperylene. As the low-boiling piperylene is consumed, the reaction with the high-boiling piperylene becomes more pronounced. At least half of the low-boiling piperylene may be allowed to react before the reaction of the sulfur dioxide with the high-boiling piperylene becomes appreciable. If a rather sharp separation is desired, it is preferred to allow the reaction to proceed until practically all of the low-boiling piperylene has reacted, since any high-boiling piperylene which reacts with sulfur dioxide to form the monomeric sulfone will be regenerated as low-boiling piperylene, but any low-boiling piperylene which is removed from the reaction zone with the sulfur dioxide and high-boiling piperylene will remain as a contaminant for the latter material. The point at which the reaction is terminated is, however, a matter of choice and will depend primarily upon the purity and kind of isomer desired.

The practice of this invention also involves the separation of piperylene from sulfur dioxide. This separation involves no particular difficulty, and may be accomplished by a distillation in the presence of a small amount of polymerization inhibitor and/or extraction with an aqueous alkali solution.

As a specific example of the method of this invention, 4.05 g. of a mixture of piperylene isomers was placed in a pyrex tube at a temperature of about −78° C. together with 4.14 g. of sulfur dioxide and 0.05 g. of phenyl-beta-naphthylamine. The tube was sealed, allowed to warm to room temperature, and then placed in a water bath at 80° C. for 10 min. and in a steam bath for 20 min. The tube was then cooled to room temperature, opened, and connected to a dry ice trap. The condensate which formed when the tube was heated at 60°–65° C. for 10 min. was placed in an open container at room temperature and the sulfur dioxide was allowed to evaporate. The last traces of sulfur dioxide were removed by washing with dilute sodium hydroxide, and the condensate was distilled. The distillate was nearly pure cis-pipylene, and was shown to be of the slow-reacting type by its reaction with maleic anhydride which required 41 min. at 100° C. The piperylene sulfone remaining in the tube after the removal of the unreacted piperylene and sulfur dioxide was decomposed by heating to about 100° C. The distillate, after removal of sulfur dioxide, was shown to be trans-piperylene which required only 12 min. at 100° C. to react with maleic anhydride.

It is not necessary that a mixture containing only piperylene be employed as the starting material in the process herein described, for mixtures of piperylenes with other hydrocarbons such as cyclopentene may equally well be employed. If a mixture of cyclopentene, high-boiling piperylene, and low-boiling piperylene is reacted with sulfur dioxide in such a manner that the principal reaction occurring is that between low-boiling piperylene and sulfur dioxide to form monomeric piperylene sulfone, the mixture of unreacted high-boiling piperylene and cyclopentene may be removed from the sulfone and freed of sulfur dioxide. The cyclopentene and piperylene may be separated by fractional distillation in the presence of a selective solvent such as acetone, furfural, or dichlordiethyl ether, or by any other desired means, and the low-boiling piperylene can be regenerated by heating and/or subjecting to reduced pressure the monomeric sulfone. Other piperylene-containing mixtures of hydrocarbons may be treated in a similar manner. Even another C-5 conjugated diene such as isoprene may be present in the starting material, for as disclosed in my above-identified copending application, isoprene sulfone decomposes at a temperature sufficiently above the piperylene sulfone to permit the isolation of both isoprene and piperylene from the mixed sulfones.

Although I have herein disclosed specific embodiments of my invention, I do not intend to limit the invention solely thereto, for many variations and modifications which will be apparent to those skilled in the art are within the spirit and scope of the invention as defined in the appended claims.

Although the specific examples have been concerned with the separation of slow-reacting piperylene from a more reactive form, the same method is applicable to slow-reacting forms of other straight-chain conjugated diolefins exhibiting geometric isomerisms such as hexadiene-1,3.

I claim:

1. The method of separating the isomers of piperylene which comprises reacting a mixture of said isomers with sulfur dioxide under such conditions that the principal reaction occurring is between low-boiling piperylene and sulfur dioxide to form monomeric piperylene sulfone, separating the sulfone from the unreacted materials, recovering the high-boiling piperylene from the unreacted materials, and decomposing the sulfone to liberate the low-boiling piperylene.

2. The method of separating the isomers of piperylene which comprises reacting a mixture of said isomers with sulfur dioxide under such conditions that the principal reaction occurring is between low-boiling piperylene and sulfur dioxide to form monomeric piperylene sulfone, separating the sulfone from the unreacted high-boiling piperylene and sulfur dioxide, separating the high-boiling piperylene from the sulfur dioxide, heating the sulfone to liberate a mixture of low-boiling piperylene and sulfur dioxide, and separating the low-boiling piperylene from the sulfur dioxide.

3. In a process of separating isomeric piperylenes from admixture with each other and with other hydrocarbons, the step which comprises reacting said mixture with sulfur dioxide under such conditions that the principal reaction between a piperylene and sulfur dioxide is between low-boiling piperylene and sulfur dioxide to form monomeric piperylene sulfone.

4. In a process of separating isomeric piperylenes from admixture with each other, the steps which comprise reacting said admixture with sulfur dioxide until at least half of the low-boiling piperylene has reacted with the sulfur dioxide and terminating the reaction before the high-boiling piperylene has completely reacted with the sulfur dioxide.

5. In a process of separating geometric isomers of conjugated diolefins, the step which comprises reacting a mixture of isomers differing in reactivity with sulfur dioxide under such conditions that the principal reaction occurring is between the more reactive isomer and sulfur dioxide to form a monomeric sulfone.

6. A process for separating a geometric isomer of piperylene which reacts with sulfur dioxide to form a sulfone from another geometric isomer of piperylene which reacts with sulfur dioxide to form a sulfone less rapidly than the first mentioned geometric isomer of piperylene which comprises reacting a mixture containing said geometric isomers of piperylene with sulfur dioxide under such conditions that the principal reaction is between the sulfur dioxide and the geometric isomer of piperylene which reacts the more rapidly with sulfur dioxide, separating the unreacted material from the sulfone formed, and decomposing the sulfone to regenerate the more reactive geometric isomer of piperylene.

DAVID CRAIG.